United States Patent [19]

Booth

[11] 3,928,551

[45] Dec. 23, 1975

[54] LEACHING POLYELECTROLYTE FLUIDIZED SOLIDS

[75] Inventor: Robert Ben Booth, Stamford, Conn.

[73] Assignee: American Cyanamid Company, Stamford, Conn.

[22] Filed: Nov. 17, 1972

[21] Appl. No.: 307,667

Related U.S. Application Data

[60] Division of Ser. No. 58,388, July 27, 1970, Pat. No. 3,746,641, which is a continuation-in-part of Ser. No. 179,287, March 7, 1962, Pat. No. 3,524,682, which is a continuation-in-part of Ser. No. 698,429, Nov. 25, 1957, abandoned.

[52] U.S. Cl. .................. 423/659; 423/625; 210/58
[51] Int. Cl. .......... C01B /00; C01C /00; C01D /00; C01F /00; C01G /00; C22B /00
[58] Field of Search .......... 423/625, 166, 167, 319, 423/320, 659, 658.5, 1; 210/52, 54, 58; 260/89.7 S

[56] References Cited

UNITED STATES PATENTS 3,418,237   12/1968   Booth et al. .......................... 210/54

FOREIGN PATENTS OR APPLICATIONS 200,682   6/1954   Australia
200,883   6/1954   Australia Primary Examiner—Oscar R. Vertiz
Assistant Examiner—Eugene T. Wheelock
Attorney, Agent, or Firm—Samuel Branch Walker

[57] ABSTRACT

Aqueous suspensions of solids with a wide particle size range having comparatively coarse materials including some larger than 65 mesh and very fine materials including some smaller than 325 mesh settle out with the solids in unclassified and in resuspendable form, when settling in the hindered state under non-Stokes conditions, is effected in the presence of a polymer of the acrylamide-acrylic acid-acrylonitrile type which causes the fines to remain with the large particles and settle out comparatively homogeneously.

This aids in preventing deposits of coarse materials in settling tanks, leach tanks, internal combustion engines and their radiators, heat exchangers, cooling towers, flowing streams in natural or man-made water courses, and mine operations, and the polymer in solution can penetrate into coarse material with fines so that settled material can be resuspended, even if the polymer is introduced after at least some settling has occured.

5 Claims, 2 Drawing Figures

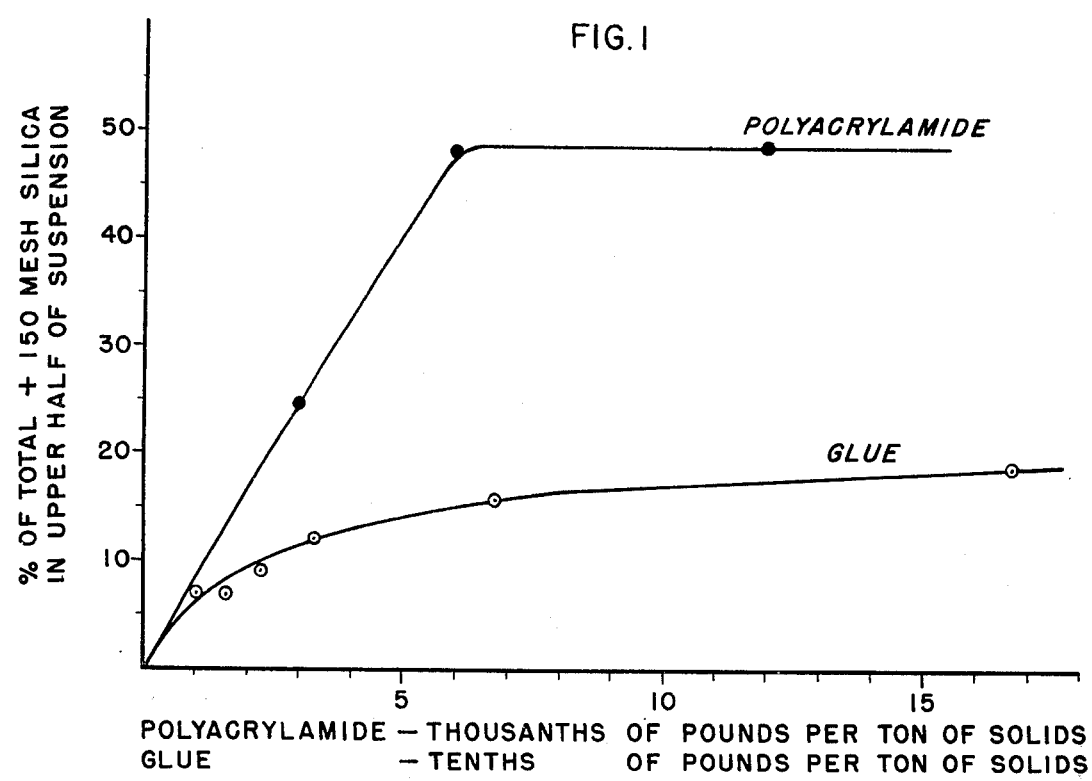
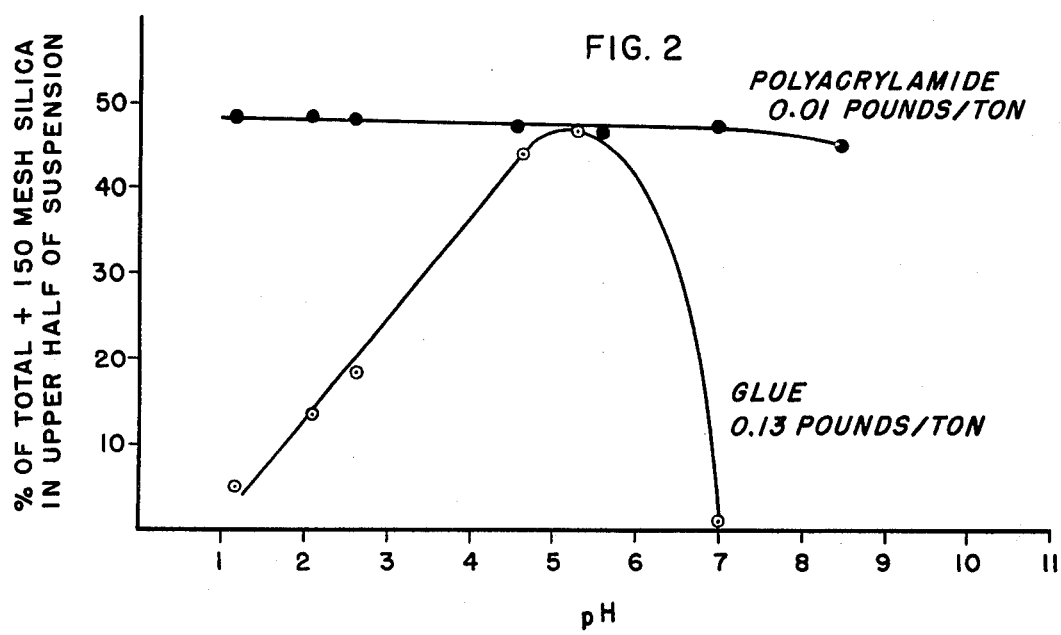

LEACHING POLYELECTROLYTE FLUIDIZED SOLIDS

CROSS-REFERENCES

This is a division of application Ser. No. 58,338, filed July 27, 1970, now U.S. Pat. No. 3,746,641, July 17, 1973, "Method of Maintaining Aqueous Suspension of Fluidized Solids in Cooling System," which is a continuation-in-part of application Ser. No. 179,287, filed Mar. 7, 1962, now U.S. Pat. No. 3,524,682, Aug. 18, 1970, "Coal Suspension Pumping Using Polyelectrolytes," which in turn is a continuation-in-part of application Ser. No. 698,429, filed Nov. 25, 1957, "Fluidizing Aqueous Suspensions of Solids," now abandoned. Other divisions of said Serial No. 58,338 include Ser. No. 307,664, Nov. 17, 1972, now U.S. Pat. No. 3,842,013, Oct. 15, 1974, "Polyelectrolyte Fluidized Aqueous Suspensions"; Ser. No. 307,665, Nov. 17, 1972, now U.S. Pat. No. 3,836,200, Sept. 17, 1974, "Conveying Polyelectrolyte Fluidized Aqueous Suspensions of Powdered Solids"; Ser. No. 307,666, filed Nov. 17, 1972, "Leaching Uranium Ores Fluidized with a Polyelectrolyte", now U.S. Pat. No. 3,852,403, Dec. 3, 1974.

SUMMARY OF THE INVENTION

This invention relates to the fluidizing of finely-divided solids such as ore and mineral suspensions, particularly those containing a broad range of particle sizes, during leaching, particularly acid leaching, and related operations, particularly the acid leaching of uranium ores, by the use of a water-soluble polyelectrolyte. The term ore refers to any solid mineral crude which can be profitably processed. This includes maintaining the fluidity of suspensions of sand, or silt, or dredged materials, and maintaining solids in resuspendable form, as in automobile radiators, heat exchangers, settling tanks, thickeners or other process equipment which could be adversely affected by fine solid materials settling out and caking to interfere with subsequent circulation or heat transfer. At times preexisting deposits are loosened and resuspended along with the solids maintained in fluidized state. Such deposits are particularly predominant in sewage lines, including sanitary, storm and industrial lines, and circulating water lines such as pipes to and from cooling towers, heat exchangers, radiators and lines to ballast tanks, dredge tanks, and spoil areas, and the like. Water-soluble linear polyalkanes having polycarboxy substituents, and conveniently, but not necessarily polycarbamyl and polynitrilo groups are effective in the fluidizing. Preferably about 90% or more of the substituents are carbamyl groups. Other groups may be present which do not interfere with the basic suspending action described.

In such operations as uranium ore leaching, the ore is ground, suspended in water with an acid, and agitated as a suspension for a sufficient length of time to dissolve the recoverable uranium, and then the solids are separated from the acid solution containing the uranium. The leaching is conducted in tanks, and the minerals are maintained in suspension by agitation. Portions of the suspended minerals tend to drop out by gravity, and clog up the agitators, pipes, pumps, and other leaching equipment.

Frequently, an aqueous suspension, through accident or design, must remain in a quiescent state for various periods of time. When permitted to remain in a quiescent state, there is a marked tendency for the coarser particles to drop out more rapidly than the finer particles with a result that there is a layer formed at the bottom of the particular vessel consisting mainly of the coarser particles, and above that is a layer which may or may not tend to drop out, containing the more finely divided materials. In other words, a form of classification occurs. In this classification there is also a tendency for the heavy coarser particles to solidify or pack or cake. Sometimes this does no particular damage, as for example, if the materials are suspended in a conical bottom tank in which air or liquid can be introduced at the bottom and thus stir up and disturb the solid materials. Sometimes even such tanks become clogged. Frequently, however, it is found that the dropping out of the solid particles causes difficulties. For example, in a leaching tank the solid particles may pack around an agitator with such firmness that it is necessary for the larger solid particles to be removed with water or air jets or even picks and shovels to permit the agitator to again start operating. Due to power outages or other accidental causes, it is not unusual for a tank to lose its agitation, and when power is again ready to be applied, it is found the agitators are so firmly frozen in position that the agitator motors burn out, or blow fuses or circuit breakers. Sometimes agitator blades or shafts are snapped.

In many instances this problem has been to some extent overcome by attempting to design equipment which minimizes the problem. As above mentioned, conical bottom tanks in which air streams can be introduced at the bottom are not so subject to clogging and, if clogged, can sometimes be placed back in operation by air action alone. In many instances it is admittedly desirable to be able to use flat bottom tanks or smaller pipes for treatment of the suspensions, but because of known difficulties, the system had to be designed to meet current operating standards, even though such design practice may have markedly increased the cost of the plant.

To some extent efforts have been made to overcome this difficulty by introducing agents, such as glue, into the suspended solids. The use of glue is sharply limited by the variation in its effect with pH and the comparatively large quantities required, which raise the cost of operations. Under the highly acid conditions used for uranium ore leaching, glue largely loses its effectiveness as a fluidizing agent. Glue is less effective at a pH range below 4 than at a pH of about 6. Glue has the further disadvantage that at lower pulp densities it is relatively ineffective. For example, in decreasing the pulp density in one Canadian uranium leaching operation from the normal 65 percent solids to 50 percent, glue in economic amounts failed to show a fluidizing effect. For some purposes, polymers of acrylic acid have been used with water-swelling clays and bentonites to make thixotropic drilling muds which suspend drill-cuttings when circulation stops. Addition of bentonites to suspensions of ores and minerals in acid leaching operations has not shown the same effect as in drilling oil wells and has failed to eliminate the above-described problems caused by the dropping out of mineral particles. Occasionally, polyacrylamides have been used to suspend uniform dispersions of fine solids, such as pigments. In ore and mineral suspensions, there is a broad range of particles sizes, and the suspension must be of a consistency which can be handled at all times.

BRIEF DESCRIPTION OF PERTINENT ART

There are many patents and publications on the interaction of polyelectrolytes and finely divided solids. A representative but not exhaustive group of such references, U.S. Patents except where stated, includes:

U.S. Pat. No. 1,976,679, Fikentscher et al., PRODUCTION OF DISPERSIONS, Oct. 9, 1934, discloses the use of materials such as sodium salt or polymerized acrylic acid with or without wetting agents or soaps for the dispersion of inorganic or organic pigments as a viscous dispersion for treating fabrics.

U.S. Pat. No. 2,327,302, Dittmar, SOAP COMPOSITION, Aug. 17, 1943, discloses the use of a precipitate-inhibiting amount of an alkali metal salt of a halogen-substituted polyacrylic acid as a hard water softening agent or for redissolving precipitates already formed and mentions use in dyeing, water softening or boiler feed water.

U.S. Pat. No. 2,328,901, Grimm et al., NITROGENOUS CONDENSATION PRODUCT, Sept. 7, 1943, discloses polymeric acrylic amide, and similiar unsaturated acid amides when polymerized are used in precipitating soluble dyes for dyeing fabrics and coloring leather.

U.S. Pat. No. 2,533,166, Jones, PROCESS FOR POLYMERIZING WATERSOLUBLE POLYACRYLAMIDES AND POLY-ALPHA-SUBSTITUTED ACRYLAMIDES, Dec. 5, 1950, discloses a method of producing polyacrylamides having a high peptizing action to "prevent the sedimentation of finely divided materials such as pigments and silver halide dispersed in aqueous media." (Column 1, lines 27–29).

U.S. Pat. No. 2,552,775, P. W. Fisher & J. F. Cook, DRILLING FLUID, May 15, 1951, describes a drilling fluid having polyacrylic acid of a molecular weight from 5,000 to 50,000 as an alkali metal salt such as the potassium or sodium salt containing sodium carbonate or sodium chloride and bentonite. Example 5 discloses a fluid having 5 percent bentonitic clay, 7 percent sodium carbonate and 1 percent potassium polyacrylate, (about 3.5 pounds per barrel), all by weight, which is then weighted with barytes to 80 pounds per cubic foot.

U.S. Pat. No. 2,616,818, Julian L. Azorlosa, PAPER COATING, Nov. 4, 1952, discloses a process for coating paper using an aqueous dispersion of clay containing about 50 to 65 percent total solids and about 6 to 10 percent polyacrylamide based on the weight of the clay as an adhesive. Glyoxal is added to render the adhesive substantially insoluble in water. Table I of this patent shows a 100 percent polyacrylamide and also a 90 percent acrylamide, 10 percent acrylic acid composition for this purpose. Molecular weights are not given.

U.S. Pat. No. 2,687,374, Mowry and Hedrick, FILTRATION METHOD, Aug. 24, 1954, discloses the use of polyelectrolytes including polyacrylamide and polyacrylic acid to aggregate soil to form a filter.

U.S. Pat. No. 2,718,497, W. N. Oldham & E. L. Kropa, DRILLING MUDS, Sept. 20, 1955, discloses 0.2 to 8 pounds per barrel (about 0.057 percent to about 2.3 percent by weight) of a polyacrylamide or polyacrylonitrile hydrolyte having a molecular weight from about 10,000 to 2,000,000 and discloses that with a polyacrylamide the hydrolysis may be at least partially accomplished by sodium carbonate in the well at the temperatures attained in use in the well. A high solids mud is described having a specific gravity of about 1.3.

U.S. Pat. No. 2,723,956, Carl E. Johnson, BOILER SCALE REDUCTION USING A COPOLYMER OF MALEIC ANHYDRIDE AND ANOTHER MONOETHYLENIC COMPOUND, Nov. 15, 1955, relates to reduction of scale in boilers using copolymers of maleic anhydride and another polymerizable monomeric compound within the range of 0.5 to 2.0 grains per gallon of feed water.

U.S. Pat. No. 2,729,557, Booth and Hedley, (Cyanamid), METHOD OF PREVENTING DEPOSITION OF ALKALINE EARTH METAL SALTS IN CYANIDATION OF PRECIOUS METAL ORES, Jan. 3, 1956, shows hydrolyzed polyacrylamide of a molecular weight of at least 10,000 in a cyanidation process.

U.S. Pat. No. 2,740,522, Aimone and Booth, (Cyanamid), FLOTATION OF ORES USING ADDITION POLYMERS AS DEPRESSANTS, Apr. 3, 1956, relates to molecular weights of about 10,000 and up in a flotation system mentioning copolymers of acrylamide and acrylic acid among others.

U.S. Pat. No. 2,745,744, Weidner and Dunlap, TREATING AGENTS INCORPORATION, May 15, 1956, discloses polyelectrolytes in paper making and to cause colloidal dispersed solids to adhere to cellulose and other fibers in a water suspension.

U.S. Pat. No. 2,751,367, Yost and Frederick, (Cyanamid), FRIABLE POLYACRYLATE POWDERS, June 19, 1956, discloses molecular weights of 88,000 to 530,000 (Col. 2, line 50) and 75 percent — COONa and 25 percent — $CONH_2$, mixed with certain insoluble clays and silicates.

U.S. Pat. No. 2,754,623, Mowry and Hedrick, EROSION-STABLE SOIL, July 17, 1956, discloses polyacrylamides, polyacrylic acid and certain other polymers added to soil to prevent erosion and improve growth characteristics.

U.S. Pat. No. 2,755,557, R. L. Morgan, (Cyanamid), DRILLING MUDS CONTAINING ACRYLIC ACID-ACRYLAMIDE COPOLYMER SALTS, Dec. 25, 1956, discloses acrylic acid-acrylamide polymer having a molecular weight of 10,000 to as high as 611,000 with the ratio of carboxylic acid groups to amide groups between 10:90 and 65:35 with bentonitic clays in drilling muds. The polymer is recommended at a usage from 0.1 to 8 pounds per barrel (about 0.028 to about 2.3 percent by weight). A typical mud contains 40 pounds per barrel of a calcium-bentonite clay. With these polymers, as additional polymer was added viscosity increased and then in many instances at higher concentrations, the viscosity dropped down.

U.S. Pat. No. 2,783,200, Crum and Wilkes, SLUDGE CONDITIONING AND DISPERSING AGENTS FOR BOILER WATER TREATMENT, Feb. 26, 1957, shows the use of certain acrylic polymers including polyacrylic acid in internal boiler water treatment particularly in conjunction with disodium phosphate.

U.S. Pat. No. 2,817,128, John A. Wickett, FOUNDRY SAND COMPOSITIONS AND PROCESS OF MAKING, Dec. 24, 1957, relates to a water soluble polymer having a weight average molecular weight of at least 10,000 and including among very many others copolymers of acrylic acid and acrylamide as binding agents for foundry sand molds.

U.S. Pat. No. 2,820,777, Suen and Schiller, (Cyanamid), PROCESS FOR PREPARING POLYACRYLAMIDE, Jan. 21, 1958, shows a method of simultaneous polymerization and hydrolysis of acrylamide for a paper additive, a coating material or a sizing material.

U.S. Pat. No. 2,894,851, Booth, Walker and Allen, (Cyanamid), METHOD OF FORMING A PROTECTIVE COATING ON CYANIDATION TAILINGS AND THE RESULTING PRODUCT, July 14, 1959, uses polymers of at least 10,000 molecular weight and copolymers of acrylamide and acrylic acid among many others to form a protective layer on cyanidation tailings.

U.S. Pat. No. 2,903,345, Hedley and Tabachnick, (Cyanamid), ETCHING OF BARIUM GLASS, Sept. 8, 1959, shows hydrolyzed polyacrylonitrile and copolymers of acrylamide and acrylic acid, among others in the inhibition of the precipitation of silicofluoride and mentiones a molecular weight of 5,000 to limits of water solubility.

U.S. Pat. No. 2,978,394, Samuel P. Moyer, (Cyanamid), POLYELECTROLYTES IN ELECTROLYSIS, Apr. 4, 1961, mentions a 90 percent acrylamide 10 percent acrylic acid copolymer and a molecular weight of 300,000 in the electrodeposition of metals from aqueous systems, including filtration of the system.

U.S. Pat. No. 2,980,609, House and Moore, (Cyanamid), CLARIFICATION OF INDUSTRIAL WATERS, Apr. 18, 1961, shows a coagulation of industrial waters with a hydrophilic aminoaliphatic linear polymer having free amine groups directly on the polymer chain and mentions molecular weights of at least 2,000.

U.S. Pat. No. 2,980,610, Ruehrwein, PROCESS FOR TREATING WATER, Apr. 18, 1961, discloses a polyacrylamide polymer for treating water which has hardness imparting compounds therein.

U.S. Pat. No. 2,981,630, Ben W. Rowland, CLAY PRODUCTS AND FRACTIONATION TREATMENT OF HETEROGENEOUS AGGREGATES SUCH AS CLAY, Apr. 25, 1961, relates to the fractionation of heterogeneous material such as clay by the use of the sodium salt of polyacrylonitrile among many other materials. This patent discloses the separation of dilatant from thixotropic clays using these polymers and stresses the non-Newtonian characteristics of the clays.

U.S. Pat. No. 2,995,512, Weidner and Dunlap, CLARIFICATION PROCESS, Aug. 8, 1961, relates to clarifying liquid suspensions disclosing a large number of polymers, but claims particularly polyelectrolytes with quaternary ammonium nitrogen mentioning particularly polyethylene imine.

U.S. Pat. No. 3,022,279, Proffitt, PROCESS FOR MAKING HYDROLYZED POLYACRYLAMIDE, Feb. 20, 1962, shows a method for producing a high molecular weight water soluble hydrolyzed polyacrylamide which is disclosed as desirable "in the sedimentation of finely divided suspended solids from aqueous media and in certain other uses."

U.S. Pat. No. 3,025,236, Barrett and Sauber, FLOCCULATION OF SOLIDS, Mar. 13, 1962, shows the sodium salt of sulfonated dodecyl diphenyl oxide and an acrylamide polymer as a flocculating agent.

U.S. Pat. No. 3,033,675, Norman Hedley, (Cyanamid), INCREASING PRECIOUS METAL RECOVERY IN CYANIDATION, May 8, 1962, shows copolymers of acrylamide and acrylic acid and others with a molecular weight of 5,000 to 100,000 in a system in which zinc dust is added for the recovery of gold and silver.

U.S. Pat. No. 3,040,820, J. P. Gallus, METHOD FOR DRILLING WITH CLEAR WATER, June 26, 1962, discloses the use of acrylamide polymer, about 0.8 to 10 percent hydrolyzed, at levels of 0.001 to 0.02 pound per barrel as it enters the well with clear water as a drilling fluid. The polymer is used as a non-selective flocculant in a drilling fluid in which clays are absent. Polymer is also added to the drilling fluid as the fluid enters the mud pit.

U.S. Pat. No. 3,040,821, M. B. Widess, DRILLING WELLS WITH CLEAR WATER, June 26, 1962, discloses the use of an acrylamide polymer hydrolyte, about 0.8 to 10 percent hydrolyzed, which polymer is used in slugs to remove cuttings in slugs. The water circulated has less than 0.5 percent solids.

U.S. Pat. No. 3,070,543, P. P. Scott, Jr., LOW SOLIDS DRILLING FLUID, Dec. 25, 1962, discloses a low solids drilling fluid containing from 0.01 to about 0.5 pound per barrel of a water-soluble vinyl-maleic copolymer which is polymerized to a viscosity of between 1 and 3 centipoises for an 0.4 percent solution in water at 25°C., which drilling fluid contains from 2 to 7 percent by weight of montmorillonitic clay. The use of 0.5 to 1.5 pounds per barrel of sodium carbonate is disclosed. The sodium carbonate enhances the action of the polymer. (At least some of the polymers disclosed have a molecular weight of about 250,000 to 500,000.)

U.S. Pat. No. 3,072,569, F. H. Siegele, (Cyanamid), DRILLING FLUID COMPOSITIONS, Jan. 8, 1963, discloses a drilling fluid comprising a high calcium content clay and as a fluid loss control agent a hydrocarbon chain polymer containing hydroxyl and carboxylic groups in the ratio of 70:90 to 30:10. The use of vinyl alcohol-sodium acrylate copolymers are exemplified, particularly for high calcium, high solids, high temperature drilling.

U.S. Pat. No. 3,080,264, Zimmie et al., METHOD OF REMOVING SILT FROM TANKS, Mar. 5, 1963, shows polyelectrolytes with a molecular weight of 100,000 to 15,000,000 for removing accumulations of silt and mud from ballast tanks. Here the polymer mechanically aids in causing the mud and silts to remain in a pumpable form.

U.S. Pat. No. 3,081,260, A. Park, LOW SOLIDS DRILLING FLUID, Mar. 12, 1963, discloses a mixture of montmorillonitic clay and polyacrylamide hydrolytes, about 0.8 to 10 percent hydrolyzed. The use of sodium carbonate is disclosed.

U.S. Pat. No. 3,085,916, Zimmie et al., METHOD OF REMOVING AND PREVENTING ACCUMULATION IN COOLING SYSTEMS, Apr. 16, 1963, discloses the use of the same polymers as in U.S. Pat. No. 3,080,264 for the combined removing and preventing of accumulation of mud and silts in water-cooled heat exchangers and cooling systems.

U.S. Pat. No. 3,102,548, Smith et al., (Cyanamid), PROCESS FOR ENHANCING THE FLOW OF FLUIDS, Sept. 3, 1963, discloses the use of a polyacrylamide to reduce friction loss under turbulent flow conditions of aqueous fluids.

U.S. Pat. No. 3,110,666, Hedley and Tabachnick, (Cyanamid), PREVENTING DEPOSITION OF COPPER AND IRON SALTS FROM ALKALINE AQUEOUS SOLUTIONS, Nov. 12, 1963, shows a polymer of at least about 10,000 molecular weight of acrylamide and for acrylic acid, among many others in the inhibition of iron and copper compound deposition.

U.S. Pat. No. 3,118,832, Katzer and Pye, CONTROL OF SILT LOAD AND SCOURING IN FLOWING STREAMS, Jan. 21, 1964, shows using polyacrylamide and hydrolyzed polyacrylamide to control the deposition of silt loads in flowing streams.

U.S. Pat. No. 3,128,249, Pye and Schura, METHOD FOR CLARIFYING WATER, Apr. 7, 1964, shows the combined use of bentonite and acrylamide copolymers in clarifying turbid water.

U.S. Pat. No. 3,130,167, Jerome Green, COAGULATING COMPOSITION, Apr. 21, 1964, relates to the use of a coagulating composition mentioning sodium polyacrylate mixed with bentonite. Column 6, lines 35 to 38 indicates a molecular weight of 10,000 to 100,000 and a ratio of polymer to clay of around 1:1 to 1:20. This patent discloses the addition of the clay as part of the coagulating composition rather than the use of the polymer to remove clay.

U.S. Pat. No. 3,147,218, Booth and Linke, (Cyanamid), SEPARATING MINERAL FINES WITH CATIONIC POLYACRYLAMIDES, Sept. 1, 1964, shows data on the effect of pH, concentration etc. on cationic, non-ionic and anionic polyacrylamides for separating fines.

U.S. Pat. No. 3,157,599, W. E. Gloor, DRILLING FLUID, Nov. 17, 1964, discloses a divinyl ether-maleic anhydride copolymer or poly(acrylic acid) as a water loss preventative with various muds.

U.S. Pat. No. 3,170,814, Stroia and Voda, METHOD OF CLEANING SEWER SYSTEMS, Feb. 23, 1965, shows the use of an organic polyelectrolyte such as hydrolyzed polyacrylamide in causing buoyant materials such as leaves, twigs etc. to float the heavier materials in cleaning sewer systems.

U.S. Pat. No. 3,171,805, Suen and Schiller, (Cyanamid), FLOCCULATION OF SEWAGE, Mar. 2, 1965, shows the use of synthetic polymers which are cationic in characteristic with a molecular weight of 10,000 and up in the treatment of domestic and industrial wastes.

U.S. Pat. No. 3,215,680, Kolodny, (Cyanamid), POLYMERIC COMPOSITIONS AND PROCESS FOR PREPARING THE SAME, Nov. 2, 1965, discloses a method of making high molecular weight polymeric compositions which are useful in flocculation.

U.S. Pat. No. 3,312,070, Matsuo et al., METHOD OF MAKING RECLAIMED GROUND WITH COAGULATIVE SURFACE ACTIVE AGENTS, Oct. 11, 1967, shows the use of polyacrylamide and other polymers added to the delivery pipe in dredging operations to cause the fines and larger particles to drop out more homogeneously to form a more uniform fill in dredging operations.

U.S. Pat. No. 3,418,237, Booth and Dobson, (Cyanamid), SETTLING OF NON-ARGILLACEOUS ORE PULPS AND MINERAL SUSPENSIONS BY USE OF WATER-SOLUBLE ACRYLIC POLYMERS, Dec. 24, 1968, (filed Dec. 22, 1953), shows copolymers of acrylamide and acrylic acid with a molecular weight of at least 10,000 for improving settling filtration and characteristics of ore pulps and mineral suspensions. The references cited, including those added by a Certificate of Correction, not herein specifically listed, are hereby incorporated by reference.

U.S. Pat. No. 3,419,502, Newman, PROCESS FOR DISPERSING SOLIDS IN AN AQUEOUS SYSTEM, Dec. 31, 1968, shows a process for dispersing and maintaining a dispersion of various solids that occur in surface waters. A partially hydrolyzed polyacrylonitrile having a molecular weight of not greater than 40,000 is shown.

U.S. Pat. No. 3,425,802, Robert B. Booth, (Cyanamid), FLOCCULATION OF IMPURITIES IN ALUM SOLUTIONS, Feb. 4, 1969, relates to acrylamide-acrylic acid copolymers with at least 60 percent amide groups and a molecular weight of at least 10,000 to improve the clarification of hot acidic alum solutions in alum manufacture.

U.S. Pat. No. 3,434,970, Siegele et al., (Cyanamid), SELECTIVE FLOCCULANT IN DRILLING MUDS, Mar. 25, 1969, shows a specific polymers of acrylic acid and acrylamide to increase oil well drilling efficiency, with the drilling fluid being such that will cuttings separate rapidly but a sodium bentonitic clay remains in the drilling fluid.

U.S. Pat. No. 3,463,730, Booth and Mead, (Cyanamid), PREVENTION OF AND REMOVAL OF SCALE FORMATION IN A WATER SYSTEM, Aug. 26, 1969, shows a polyacrylamide in the molecular weight range of 1,000 to 8,000 with about 10 to 50 percent unhydrolyzed amide groups for scale inhibition.

U.S. Pat. No. 3,480,761, Kolodny and Booth, (Cyanamid), CLEAR OVERFLOW SETTLING WITH VERY HIGH MOLECULAR WEIGHT POLYELECTROLYTES, Nov. 25, 1969, shows a very high molecular weight polyacrylamide with a very low degree of hydrolysis in the flocculation and polymerization of solids from an aqueous system.

U.S. Pat. No. 3,488,718, Innes and Paul, (Cyanamid), FILTRATION OF HYDROUS OXIDES, Jan. 6, 1970, (original filing Aug. 14, 1952), shows using specific polyelectrolytes for the improvement of the filtering and washing characteristics of synthetic hydrous oxides.

U.S. Pat. No. 3,508,407, Booth, (Cyanamid), MINE BACKFILL PROCESS, Apr. 28, 1970, shows polyelectrolytes including hydrolyzed polyacrylamide to retain cement fines with coarser particles in mine backfilling operations.

U.S. Pat. No. 3,516,932, Hedrick and Mowry, CLARIFICATION OF WATER, June 23, 1970, shows the use of homopolymeric acrylamide in clarifying an aqueous suspension in which the particles are already flocculated by an inorganic salt.

Great Britain, Pat. No. 724,683, Feb. 23, 1955, discloses a boiler water treating composition consisting of a polyacrylic acid as a water-soluble salt and a water softening agent such as the "alkali metal carbonates bicarbonates, orthophosphates and polyphosphates." Page 2, lines 50 and following in part reads: "In general, polyacrylic acids of a molecular weight from as low as 1,000 as high as 30,000 or 50,000 or even 80,000 may be used."

Canadian Pat. No. 477,265, Azorlosa, PREPARATION OF PAPER PRODUCTS, Sept. 25, 1951, shows a copolymer of acrylamide and acrylic acid incorporated in a paper furnish to increase the wet and dry strength of the paper.

Canadian Pat. No. 539,813, R. L. Morgan, (Cyanamid), NON-HYGROSCOPIC HYDROLYZED POLYACRYLONITRILE SALTS, Apr. 23, 1957, discloses a dry mixture of a hydrolyzed acrylonitrile polymer having a molecular weight of from 75,000 to 300,000 on bentonite as a carrier.

Canadian Pat. No. 589,543, Booth, (Cyanamid), FLOCCULATION OF AQUEOUS POLYACRYLAMIDES, Dec. 22, 1959, discloses the maintaining of polyacrylamide in aqueous solution from time of manufacture until use, thus preventing the degradation of polymer characteristics from the mechanical aspects of drying and handling.

Canadian Pat. No. 615,987, R. B. Booth, (Cyanamid), FLUIDIZING AQUEOUS SUSPENSIONS OF SOLIDS, Mar. 7, 1961, is the Canadian equivalent of applicant's parent case.

Canadian Pat. No. 642,565, R. L. Morgan, (Cyanamid), HYDROLYZED CHLORATE-POLYMERIZED POLYACRYLONITRILES IN DRILLING MUDS, June 12, 1962, disclosels an aqueous clay suspension with 2 lbs. per bbl. of hydrolyzed polyacrylonitrile.

Canadian Pat. No. 662,534, Masselli and Booth, (Cyanamid), CHEMICAL TREATMENT OF ORGANIC WASTES, May 7, 1963, shows polyelectrolytes in the treatment of sewage alone and with inorganic electrolytes.

Canadian Pat. No. 700,862, F. M. Aimone, (Cyanamid), POLYELECTROLYTES IN DRILLING OPERATIONS, Dec. 29, 1964, shows a polyelectrolyte of molecular weight of at least 5,000 to 20,000 in drilling with water.

In re Azorlosa, 113 USPQ 156 (CCPA, 1957), rejects claims on copolymers of acrylic acid with acrylamide as a wet strength paper resin.

Prior art cited in parent applications is hereby incorporated by this reference.

For systems of inert solids in a viscous fluid, Stoke's law gives the rate of fall. When a small sphere falls under the action of gravity through a viscous medium it ultimately acquires a constant velocity, $$V = \frac{2ga^2(d_1 - d_2)}{9\eta}$$

where $a$ is the radius of the sphere, $d_1$ and $d_2$ the densities of the sphere and the medium respectively, and $\eta$ the coefficient of viscosity. $V$ will be in cm per sec if g is cm per sec$^2$, $a$ in cm, $d_1$ and $d_2$ in g per cm$^3$ and $\eta$ in dyne-sec per cm$^2$ or poises.

Here, the particles, particularly in the presence of the polyelectrolyte have a layer of bound water, which increases their effective size, and reduces the difference in density. Also, and probably more importantly, Stoke's law is only valid where each falling particle is unaffected by adjacent particles. In the present systems, enough particles are present so that each is affected by its neighbors. This is called hindered settling as each particle hinders the movements of its neighbors. Such systems often have too many uncontrollable variables for effective rigorous theoretical treatment, and empirical results are fitted to generalized equations.

DETAILED DESCRIPTION

It has now been found that by introducing from about 0.005 to 5 pounds per ton of suspended solids of a polyelectrolyte into the aqueous suspension there is a tendency for the finer particles to integrate with larger and give a composition of more uniform characteristics, and hence fluidize the suspension.

The fluidization is particularly useful at comparatively high solid concentrations and in fact makes feasible the use of concentrations of solids which were previously regarded as completely inoperable. In other words by using the present novel fluidizing agents, a higher percentage of solids can be handled in leaching, stirring and agitating operations and the suspensions can be treated in tanks and other equipment and more uniformly and smoothly fed through pipes, valves, bends, turns, sumps, siphons, pipelines, etc. than has been previously possible with known fluidizing agents. The high degree of mobility thus imparted to the ore suspensions definitely facilitates their handling.

The effect which herein is called fluidizing, or anticaking or anti-packing, is rather difficult to explain theoretically. In certain tests, for instance, it is found that if a suspension of a mixture of fine and coarse minerals is agitated, the material remains fluid and fairly easy to handle. If, however, stirring is stopped, the coarser solids rapidly drop out and thus form a stable dense layer, In contradistinction thereto by using the present polyelectrolytes there is formed a fluidized suspension in which the solids drop uniformly, if at all, as a homogeneous fluidized mass so that on moderate agitation the solids are again uniformly suspended.

The use of the polyelectrolyte fluidizing agents is highly beneficial and gives improved results in the leaching of a variety of ores, concentrates, roasted and calcined products, metallurgical slags and mattes and residues, which contain uranium, cobalt, and other rare metals, copper, nickel, zinc, manganese, calcium phosphate, titanium, alumina, bauxite, bauxite clays, kaolins, etc. Such leaching may be conducted at atmospheric pressure in vessels equipped with air and/or in mechanical agitators, or in Pachuca-type tanks equipped with air lifts for circulating the ore pulp, and also under pressure in specially constructed tanks or autoclaves. In such leaching operations temperatures range from room temperature up to 100°C., or higher if pressure vessels are used. Various acids such as sulfuric, sulfurous, nitric, phosphoric, and hydrochloric acids are used in such leaching operations. Also acids may be autogenously generated by simply adding water to dissolve the acid constituents of ores or concentrates and the resulting acidic liquors used for leaching pruposes.

The effect of the polyelectrolytes is particularly useful in operations, such as the extraction of uranium from uranium ores, in which the ore is leached with an acid, such as sulfuric acid or nitric acid. As the leaching occurs, it is preferred that the system be such that moderate agitation can be employed, rather than high speed violent agitation, to prevent the dropping out of a layer of ore solids. Also, it is highly desirable that the suspension be such that should a power failure occur, the settled solids in the leach tank do not set up so as to require laborious and time-consuming manual cleanouts.

In the processing of ores, and particularly uranium ores, the marked advantages introduced by the present fluidizing may be utilized in any of several ways. The present fluidizing agents allow leaching to be conducted over a wider range of pulp densities than previously used. It is possible to use smaller agitation equipment to keep the solids suspended, or to use less power for agitation; or in the case of some ores, to use a higher solids concentration in the pulp so that more ore can be processed through a given series of leaching vessels; or to use the improved fluidization to permit the utilization of less finely ground ores and save in the cost of grinding of the ore. The advantages of the present fluidization may be utilized in part by taking advantage of any or all of these process improvements. The leached solids can conveniently be manipulated with a size range of an appreciable fraction, of up to 50 percent, larger than 65 mesh, or with up to 50 percent smaller than 325 mesh, or any intermediate ratios.

In addition to the increased flexibility of operations, there is a tremendously important advantage that should any portion of a fluidized system remain unagitated even for considerable periods, the solids remain in a fluidized state so that immediately on resumption of agitation or circulation the materials flow readily.

The polyelectrolyte may be added at any point in processing where it is desired to prevent the heavier particles from settling out, and to maintain a fluidized state. The polyelectrolyte may be used in conjunction with agents, such as glue or gelatin, or may be used alone. All of the fluidizing agent may be added initially, or part of the polyelectrolyte may be added initially and additional quantities added after part of the leaching has taken place.

Such staged additions as above are preferred by many operators particularly if the ore suspension is processed for long periods of time. Additional quantities of the same or different polyelectrolyte may be added to assist in a subsequent dewatering operation in which the fluidized solids are separated from the aqueous phase by filtration or decantation, such as land fill or tailings, or from dredging operations.

The polyelectrolyte fluidizing agent may be added as a solution or in dry sub-divided solid form to the suspended solids. Dry additions are preferred in many operations, especially those of long duration wherein the suspension is processed over several hours or several days. In such cases, the feeding of staged additions of the polyelectrolyte as a dry solid is the preferred practice. For example, in continuous leaching of ores in agitators arranged in series, excellent results are obtained by feeding continuously small amounts of the polyelectrolytes in dry solid form to some or all of the agitators in the series. Continuous feeding to batch leaching also gives excellent results. The preferred polyelectrolyte fluidizing agents dissolve so as to be present in concentrations sufficient to impart the desired improved fluidity to the suspension of mineral solids. The polyelectrolyte may also be added as a solution in water or other solvent and as such may be fed in a single stage, in multiple stages or continuously. Solutions of the polyelectrolyte are particularly convenient for small scale operations. Solid feed is more convenient for larger operations.

The polyelectrolytes may be added to the suspensions of solids in water in various fashions. For example, the polymers may be added to the solids before the solids are suspended, or they may be added to the water or solutions in which the materials are to be suspended or may be added to the suspension after it is formed. For convenience in measuring small amounts of the added polyelectrolyte, it is particularly convenient to dissolve the polyelectrolyte in water to form stock solutions of 1 – 5 percent concentration, which may be diluted if desired to allow accurate feeding of small quantities.

In feeding dry polyelectrolytes, a vibrating type feeder, or other type feeder may be used to slowly feed the system. A slow flow of solid particles is easily dispersed, and lumping of the polyelectrolyte does not occur. The usual equipment used for feeding liquid reagents in mineral dressing practice may be used for feeding solutions of the polyelectrolytes.

All or a major portion of the polyelectrolyte may be added initially, but, the polyelectrolyte appears to be absorbed on the surface of fines in the mineral suspensions and better results are obtained with a given amount of polyelectrolyte, or the same results with a smaller amount of the polyelectrolyte, if the addition is gradual during the period of agitation in leaching, or other treating of the ore.

Additional quantities of the polyelectrolyte may be added after the leaching is complete to act as a flocculant in separating the ore from the water or aqueous solutions in the suspension.

The polymers which are found to be effective in the fluidizing of aqueous suspensions of solids are water soluble polymers of a compound represented by the formula:

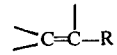

wherein R is selected from the group consisting of nitrile, amide, and carboxyl radicals, COOM where M is a lower alkyl radical preferably of 1 to 4 carbon atoms, and the water soluble salts thereof. Elements such as halogens, particularly chlorine, or alkyl or aryl groups as well as hydrogen may be present on the backbone hydrocarbon chain of the polymer.

Suitable polymers for use in the present invention may be obtained by polymerizing acrylic compounds, such as acrylic acid or derivatives having groups which are hydrolyzable to acid, such as, for example, acrylonitrile, esters of acrylic acid, etc. Chloroacrylamide or methylacrylamide give polymers with substituents on the backbone. Acrylic acid or acrylamide may be polymerized to form homopolymers or may be copolymerized with other compounds of the group or small amounts of other compounds, such as diallyl dimethyl ammonium chloride, vinyl pyridine, vinyl acetate, styrene, vinyl ethers, vinyl halides, or unsaturated hydrocarbons such as isobutylene. Particularly useful are polyacrylic acid, polyacrylamide, hydrolyzed polyacrylonitrile, including acid-hydrolyzed polyacrylonitrile, and alkali-hydrolyzed polyacrylamide, and acrylic acid-acrylamide copolymers. Water-soluble cross-linked polyacrylamides are also useful and methylenebisacrylamide in small quantities is a highly useful cross linking agent. These polymers of low, medium, and high viscosities, or molecular weight range are satisfactory. Molecular weights as low as 100,000 are useful. Molecular weights of well over 3 million are preferred. As long as the polymers are sufficiently low in molecular weight to be water soluble, they have the characteristics required. Polymers of molecular weights of at least 20 million have such attributes.

The upper limit is very ambiguous as different methods of measuring molecular weight give materially different values, since different measurements by supposedly reliable methods give variations of 2,000,000 to 5,000,000 in the molecular weight of a single polymer. Viscosity measurements, particularly intrinsic viscosity determinations, are a convenient method of characterizing polymers, as described by M. L. Huggin in "Industrial and Engineering Chemistry" Volume 35, pages 980–986 (1943). Viscosity determinations may be conducted by well known methods such as by an Ostwald viscosimeter at polymer concentrations of 0.05–0.5 percent at 30°C.

Polyacrylamide, polyacrylic acid and hydrolyzed polyacrylonitrile have the general formula:

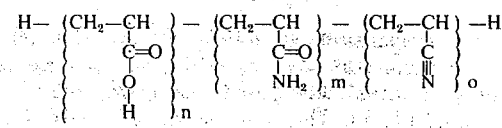

where n, m and o are whole numbers, and the groups within the parentheses occur in random order and orientation. n is at least 3, and o may be zero, and m may be zero, but preferably m is greater than n. The groups can be referred to as carboxyethylene, carbamylethylene and nitriloethylene, respectively. The carboxy group, of course, can exist as its salt, and as an alkali salt such as sodium or in solution in ionized form, and such forms are the natural and inherent equivalent of the carboxy form itself in the present suspension system, as enough cations of various salts are present in the solids and water to react with free carboxyl groups, to form salts. The free acid with polyacrylamide, or the sodium salt of hydrolyzed polyacrylonitrile are frequently preferred commercially.

The nitriloethylene group is not inherently required and is normally only present in small proportions representing an unhydrolyzed fraction from the polymerization of materials containing acrylonitrile. At least some carboxyethylene linkages are present in all commercial products. In polymerization of acrylamide, at least a small fraction is hydrolyzed, and at least three carboxy groups are present per molecule, even though with molecular weight of over a million, the actual percentage can be very small.

By historical custom, many of the present polyelectrolytes are referred to and named as polymers of the more conventional starting materials, such as polyacrylamide or polyacrylic acid, although the same compound can be formed by the hydrolysis of polyacrylonitrile, hydrolysis of polyacrylamide or copolymerization of acrylamide-acrylic acid. Thus, a hydrolyzed polyacrylonitrile is actually essentially a polycarbamylethylene-polycarboxyethylenepolyelectrolyte.

A minor proportion of linkages from the other vinyl compounds above referred to may be present, to adjust the cationicity, anionicity, or charge along the polymer chain, and where not highly branched or cross-linked the polymer remains soluble. Such minor proportions may be designed in to change the charge, or may result from impurities during manufacture. Salts produced during manufacture may remain with the polymer, as may solubilizing materials. A small amount of sodium sulfate or a lower alkanol can improve the solubility of the high molecular weight polymers.

The polyacrylamides are particularly effective in acid leaching, such as used with uranium ores. The polyacrylamides retain their efficiency even at a pH more acid than 1. Polyacrylic acid and hydrolyzed polyacrylonitriles are also particularly useful for alkaline circuits containing alkaline earth minerals.

The present effect is particularly useful where there is a wide range of particle size present. For instance, while a polyelectrolyte is useful as a fluidizing agent if added to a suspension of uniformly sized coarse materials, it is much more effective if fines are also present.

The exact size range over which the present effect occurs is very wide indeed. It is particularly useful when some of the suspended materials are comparatively coarse — that is, are retained on a 65 mesh per inch screen and others are comparatively fine, that is, readily pass a 325 mesh to the inch screen.

More coarsely ground ores may be leached in the presence of the present fluidizing polyelectrolyte, as such coarse material does not then clog up the agitators. The use of the fluidizing polyelectrolyte permits concurrent treatment of the sands and slimes instead of using separate leaching circuits, as it permits the leaching of a more coarsely ground ore under a particular set of conditions. With ores or minerals in which the specific gravity is higher, a finer state of division is normally required for a full fluidizing effect. It is to be noted that even if complete fluidization does not occur, none the less a partial fluidization is extremely useful in maintaining circulation.

The theory of interaction is not well developed. Probably the polymer attaches to the surface of both coarse and fines, and binds water so that the particles have a layer of bound water, which adds to the apparent size, and reduces the apparent density difference, so that Stoke's law requires major correction factors to apply, and at least part of the polymer chains bridge between particles. This causes the fines and coarse to act as a more homogeneous material, with water being in effect filtered out, instead of a settling of particles in waters, and as a result, the settled solids are readily resuspendable, or even if long settled, are more easily suspended. This applies to resuspending deposits in leach tanks, storage tanks, cooling or heating tanks, treating vessels, pipelines, and other places where the coarse solids could settle out and inhibit flow, and be difficult to resuspend; or have settled out, and when resuspended tend to rapidly resettle. Another effect is that the polymer increases the viscosity of the aqueous phase, and as thicker, keeps the particles more readily resuspendable. The use of these polymers increases pipeline capacity in turbulent flow, see 3,102,548. supra, and the greater scour induces improved suspension and resuspension characteristics in the systems.

This application is not predicated upon the correctness of any theory of operation, but such a theory of operation does make the illogical seem more comprehensible, even if it still remains unobvious. But these characteristics permit tremendous advantages in settling of solids to provide a more homogeneous material, whether as a resuspendable solid in a leach tank, a land fill for dredging, silts in heat exchangers, or ballast tanks, or sewage solids in a disposal plant.

The efficacy of fluidization is more easily illustrated with a mixture of just coarse and fines — in most operating embodiments, the range of particles sizes would be a continuous spectral.

Certain of the examples show just coarse and fine for purposes of illustration. The continuous range shown in samples from commercial grinding operations is more typical of normal usage. A rapidly classifying fraction of +65 mesh material — over about 5 percent of the total solids — causes the problem in commercial operations. The density of components and degree of agitation enter. The greater the particle density, and the lower the agitation, the less suspending action from liquid turbulence, and the greater the need for polymer suspending action. When flow suspending action ceases, as during power outages, the time and character of suspended particles is a factor in ease of resuspendability. The economic factors can readily control the amount of polymer added, as a small amount may be sufficient to give needed resuspendability. Often if the polymer is added when resuspending is desired, adequate results are obtained. Often, the use of the polymer permits a coarser grind in milling operations, with an adequate safety factor of resuspendability. This is particularly controlling in operations where resuspendability had been the controlling factor in fineness of grind.

FIG. 1 shows the suspending effect of polyacrylamide versus glue as a function of concentration.

FIG. 2 shows the suspending effect of polyacrylamide versus glue as a function of pH.

Whereas the exact scope of the present invention is set out in the appended claims, the following specific examples illustrate certain aspects of the present invention, and more particularly point out methods of evaluation or testing to show the unique advantages of fluidization with polyelectrolytes. All parts are by weight, unless clearly otherwise set forth.

EXAMPLE 1

A uniform suspension of ground silica in water, about 620 ml. in volume and 60% solids (weight/weight) in pulp density, is prepared by the addition of 300 grams of plus 150 mesh silica and 300 grams of minus 200 mesh silica to 400 grams water which contains sufficient sulfuric acid to give a pH of 1.0 to the final suspension. The plus 150 mesh fraction contains about 48% of plus 65 mesh material and about 3 percent plus 48 mesh material. The mixture is agitated with a plunger for about 30 seconds, thus forming a uniform suspension. The suspension is allowed to stand for two minutes during which time the coarse fractions of the suspended silica are observed to drop out rapidly. Then the upper half of the suspension, is drawn off and filtered. The filter cake is dried and screen analyzed to determine the content of plus 150 mesh silica.

A series of tests as above were run in which the silica suspensions were allowed to stand for the two-minute period after treatment with various amounts of a polyacrylamide with a molecular weight of approximately 2 million. A second series of tests were run under the same conditions using glue instead of polyacrylamide. The glue or polyacrylamide were dissolved in 100 gram portions of the water used to suspend the silica.

The amounts of plus 150 mesh silica contained in the upper half of the suspension at the end of two-minutes settling period at a pH of 0.1 were found to be as follows:

| Test | Pounds Per Ton of Polyacrylamide | Glue | +150-mesh Silica in the Upper Half | |
|---|---|---|---|---|
| | | | Grams | % of Total |
| 1 | none | none | none | none |
| 2 | 0.003 | " | 74 | 24.7 |
| 3 | 0.006 | " | 144 | 48.0 |
| 4 | 0.012 | " | 146 | 48.7 |
| 5 | none | 0.1 | 20 | 6.7 |
| 6 | " | 0.17 | 20 | 6.7 |
| 7 | " | 0.23 | 27 | 9.0 |
| 8 | " | 0.33 | 37 | 12.3 |
| 9 | " | 0.67 | 47 | 15.7 |
| 10 | " | 1.67 | 56 | 18.7 |

These results are graphically presented in FIG. 1, which clearly demonstrates the superiority of polyacrylamide to glue as a fluidizing agent.

EXAMPLE 2

Uniform suspensions of mixed +150 and −200 mesh silica are prepared as set forth in Example 1 and treated with polyacrylamide and glue at the natural pH of the suspensions, pH 5.6. The amounts of +150 mesh silica in the upper half of the suspension after the two-minute settling period in one particular run at a pH of 5.6 was found to be as follows:

| Test | Pounds Per Ton of Polyacrylamide | Glue | +150-Mesh Silica in Upper Half | |
|---|---|---|---|---|
| | | | Grams | % of Total |
| 1 | none | none | 0 | 0 |
| 2 | 0.003 | " | 71 | 23.7 |
| 3 | 0.006 | " | 140 | 46.7 |
| 4 | 0.009 | " | 142 | 47.3 |
| 5 | 0.012 | " | 142 | 47.3 |
| 6 | none | 0.07 | 79 | 26.3 |
| 7 | " | 0.10 | 131 | 43.7 |
| 8 | " | 0.13 | 141 | 47.0 |
| 9 | " | 0.17 | 140 | 46.7 |

EXAMPLE 3

Uniform suspensions of mixed +150 and −200 mesh silica are prepared as described in Example 1. The natural pH of such suspensions is 5.6. To a series of such suspensions sulfuric acid or sodium hydroxide is added so as to vary the pH over the range of 1.2 to 8.5. To each suspension 0.01 pounds per tone of polyacrylamide is added. To a second series of suspensions with a similar pH range, 0.13 pounds per ton of glue is added. Following the addition of polyacrylamide or glue in solution as described in Example 1, each suspension is agitated and then allowed to stand for two minutes. The upper half of the suspension is drawn off and filtered, and the filter cake dried and screen analyzed to determine the content of +150-mesh silica.

For one particular typical run the amounts of +150-mesh silica contained in the upper half of the suspension were as set forth in the following table.

| pH | 0.01 lb/ton Polyacrylamide +150-mesh Silica in Upper Half | | 0.13 lb/ton Glue +150-mesh Silica in Upper Half | |
|---|---|---|---|---|
| | Grams | % of Total | Grams | % of Total |
| 1.2 | 145 | 48.3 | 15 | 5.0 |
| 2.1 | 146 | 48.7 | 41 | 13.7 |
| 2.6 | 143 | 47.7 | 50 | 16.7 |
| 4.6 | 142 | 47.3 | 133 | 44.3 |
| 5.6 | 140 | 46.7 | 141 | 47.0 |
| 7.0 | 143 | 47.7 | 4 | 1.3 |
| 8.5 | 137 | 45.7 | none | 0 |

The above data is shown in FIG. 2. The particularly wide range of pH values over which the polyacrylamide is effective is clearly shown by this example.

EXAMPLE 4

A sample of Canadian uranium ore is ground to about −48 mesh with 59 percent −200 mesh in particle size, and leached at 60% solids with 60 grams per liter of sulfuric acid in aqueous solution. Samples of the leached pulp containing 600 grams of ore are treated with polyacrylamide in a series of tests and allowed to stand for fifteen minutes after which time the upper 300 cc. of the suspension is siphoned off and filtered. The filter cake is dried and screen analyzed to determine the content of +200 mesh ore solids. A second series of samples of the leached pulp are treated simultaneously with glue, and screen analyzed as above. The polyacrylamide and glue are added in aqueous solution.

The results of one series of tests are shown in the following table.

| Test | Pounds Per Ton of Polyacrylamide | Glue | + 200 mesh Solids % of Total |
|---|---|---|---|
| 1 | none | none | 4.1 |
| 2 | 0.003 lbs/ton solids | — | 27.8 |
| 3 | 0.006 " | — | 36.5 |
| 4 | 0.009 " | — | 41.9 |
| 5 | 0.015 | — | 40.2 |
| 6 | — | 0.13 lbs-ton solids | 31.5 |
| 7 | — | 0.26 " | 29.0 |
| 8 | — | 0.5 " | 30.3 |
| 9 | — | 1.0 " | 36.1 |

EXAMPLE 5

Samples of 1200 grams of the uranium ore described in Example 4 were leached with 60 grams sulfuric acid per liter at a pulp density of 60 percent solids in 1500 cc. beakers for 6 hours at 45°C. During this time the pulp was agitated with an electrically-driven, cruciform impeller operating at 250 rpm.

At the end of this 6-hour period the stirrer was removed and immediately in the pulp on the bottom of the beaker was placed a flat, stainless steel circular disc, 3/64 inch thick and 1.5 inches in diameter, to which at the center a stainless steel rod, ⅛ inch in diameter and 8 inches in length was attached. This rod was equipped with a hook at its upper end so that it could be attached to a 2000-gram spring balance and thus the pull required to start the disc upward through the pulp could be measured. The pull is measured after the pulp is permitted to stand for a specified period of time. This testing method is similar to methods which have found acceptance in the industry to distinguish pulps which cause trouble and is highly useful in determining the degree of compaction that ore or mineral suspensions exhibit on standing.

A series of tests were run by this procedure in which the agitation time was varied from 6–24 hours and the standing time from 16–54 hours. Polyacrylamide or glue in dry solid sub-divided form were added at the start of these tests and the results obtained were compared with those of control tests on leached ore pulp without such fluidizing additives. The results of these tests are summarized in the following table.

The above tests simulate conditions which occur in the processing of ore pulps in various operations during plant shut downs, power-outs, etc. and the above results clearly demonstrate the effectiveness of small amounts of polyacrylamide in overcoming the compacting of ore suspensions on long periods of standing.

EXAMPLE 6

A 100,000-ton lot of uranium ore was processed continuously at the rate of 3000 tons per day as follows: the ore was ground to minus 48 mesh and leached to extract uranium at 65–68 percent solids in water with 60 grams sulfuric acid per liter in the presence of 4.0 lb/ton sodium chlorate. Leaching temperature was 45°C. The ore fed to the leaching operation was split so as to pass continuously into two series of six similar size and type tanks equipped with agitators so that each series treated 1,500 tons per 24 hours. The capacity of the tanks in each series was such that the total leaching cycle was 48 hours. Each tank held 250 tons of ore and a total of 3,000 tons was agitated at one time. Glue was used as a fluidizing agent in one series of six agitators and polyacrylamide was used in the other.

Glue was added in dry granular solid form and glue requirements were 600 lb. to each agitator during startup operations and an additional 1.2 lb. per ton of ore was fed continuously in equal portions divided among the six agitators. The total glue used for effective fluidization in treating the ore in the first series of agitators was 63,600 pounds.

Polyacrylamide of an intrinsic viscosity of about 5.6 was added in dry, solid flake form. Polyacrylamide used was only 60 lb. per agitator during start-up operations and an additional 0.12 lb. per ton of ore, fed continuously in equal portions divided among the six agitators. Thus, the total requirements were 6,360 pounds, which amounts to one-tenth of the quantity of glue used in similar operations in the first series of agitators.

The fluidization with polyacrylamide was more effective than with the glue. A convenient test as used in the industry is to take a liter of the ore suspension, three times a shift, in a graduated cylinder, allow to stand for five minutes, and measure the sands dropping out into the bottom of the graduate. In the above test with polyacrylamide 10 cc. of such sands were noted as compared with 40 to 60 cc. with glue. This shows the polyacrylamide to be more effective for fluidizing purposes than 10 times as much glue.

EXAMPLE 7

A 100,000-ton lot of uranium ore was leached as described in Example 6. In the first series of agitators

| Run | Material Added | Hours Agitation | Hours Standing | Balance Reading grams |
|---|---|---|---|---|
| 1 | none | 6 | 16 | 1600 |
| 2 | 0.1 lb/ton Polyacrylamide | 6 | 16 | 800 |
| 3 | 0.1 lb/ton Polyacrylamide | 6 | 54 | 1000 |
| 4 | 0.7 lb/ton Glue | 6 | 16 | 1200 |
| 5 | none | 24 | 24 | Balance pulled off scale and lifted beaker and contents off table. |
| 6 | 0.1 lb/ton Polyacrylamide | 24 | 24 | 1200 |
| 7 | 0.7 lb/ton Glue | 24 | 24 | Balance pulled off scale |

6360 lb. of polyacrylamide of about 2 million molecular weight was added as a fluidizing agent, which was used as also described in Example 6. No clogging or stoppages of agitators during the course of the leaching operations were noted.

In the second series of agitators no fluidizing agent was added. In this case agitator stoppage occured in some of the leaching tanks before these tanks were completely filled, because of drop-out of coarse solids at the bottom of the tanks. In other tanks the agitators operated for a few hours and then stalled for the same reason. Leaching operations had to be suspended in this section of the plant and the acidic solutions and hardpacked ore were removed by flushing with water and manual digging.

EXAMPLE 8

The same uranium ore and procedure as described in Example 4 are used to test the action of a variety of polymers for keeping the +200-mesh ore particles from dropping out of the suspension. The polymers are used in the amount of 0.015 lb/ton in each test. The results of typical tests are summarized in the following table.

| Polymer Used | Intrinsic Viscosity | % of Total + 200-mesh in Upper Half |
|---|---|---|
| Polyacrylamide | 6.4 | 43.7 |
| Polyacrylamide | 5.5 | 43.0 |
| Polyacrylamide | 3.1 | 43.5 |
| Polyacrylamide | 2.5 | 41.0 |
| Polyacrylamide | 1.8 | 40.0 |
| 90:10 Copolymer of Acrylonitrile-Acrylamide | 5.4 | 41.0 |
| 89:11 Copolymer of Acrylamide (AM) Diallyldimethyl Ammonium Chloride (DADM) | 5.7 | 42.0 |
| 80:20 Copolymer of AM-DADM | 5.4 | 41.0 |
| 96:4 Copolymer of AM-DADM | 5.0 | 41.0 |
| 96:4 Copolymer of AM-DADM | 3.4 | 40.0 |
| 96:4 Copolymer of AM-DADM | 1.8 | 39.0 |
| 96:4 Copolymer of AM-DADM | 1.4 | 39.0 |
| A cross-linked Polyacrylamide (0.1% Methylene-bisacrylamide) | Mol. wt. about 2 million | 35.0 |
| Polyacrylamide with 6.2% of the amide groups hydrolyzed to carboxyl groups | 5.7 | 29.0 |

EXAMPLE 9

A nickel-cobalt ore, assaying 1.2% Ni and 0.14% Co was ground to 50 percent minus 200 mesh and pressure leached for 2 hours with 22 percent sulfuric acid at 30 percent solids. 91.2 percent of the nickel and 92.0 percent of the cobalt was extracted in the leaching operation.

Treatment with 0.2 lb/ton of polyacrylamide during the leaching operations allowed the use of a pulp density of 40% solids with other conditions similar to those listed above. The higher pulp density in leaching did not interfere with extraction as 91.3 percent of the nickel and 92.1 percent of the cobalt were extracted in this test.

EXAMPLE 10

A manganese ore, assaying about 18.3% Mn, was ground to minus 200 mesh and leached at 20 percent solids with a 6 percent water solution of sulfur dioxide for 6 hours at room temperature. The residual ore solids were filtered off, dried, weighed, and assayed for manganese along with the leach liquors. In this operation 87.6 percent of the total manganese was extracted.

The above procedure was repeated on a second lot of the same manganese ore to which was added 0.15 lb/ton of a 90:10 copolymer of acrylamide-acrylic acid of molecular weight of about 2,000,000 as measured by viscosity methods. In this leach a higher pulp density, 35 percent solids, was employed. No difficulties in agitation during leaching were noted and an extraction of manganese of 87.7 percent was obtained, which duplicated the results of the first leach described above in this example.

EXAMPLE 11

A uniform aqueous suspension of fine silica (−200 mesh) with a total volume of 1,000 millimeters in a graduated cylinder is prepared. This suspension is allowed to stand for three days. During this time, the silica settles to a compacted mass which cannot be poured with the supernatant liquid by inclining the graduate and must be flushed out by a stream of high pressure water from a laboratory hose in order to clean out the graduate. The experiment is repeated exactly except that the equivalent of 0.013 pounds per ton of a polycarbamylethylene of 3–5 million molecular weight and containing about 1 percent carboxyethylene linkages is added to the suspension, by agitation with a perforated plunger. After standing three days, the major portions of the solids at the bottom of the graduate were poured out readily along with the water. A similar experiment is run using a long chain polycarbamylethylene of about the same molecular weight range containing 5 percent carboxyethylene linkages. Again, after three days of standing, the settled solids are pourable along with the supernatant water.

EXAMPLE 12

The experiment described in Example 11 was repeated with a suspension of 150 grams of −150 mesh limestone in one liter of water. After standing for a three-day period, the settled solids remained compacted in the bottom of the graduate while the supernatant water was poured off.

This experiment was repeated using the equivalent of 0.2 pounds per ton of a hydrolyzed polyacrylonitrile as the sodium salt. The settled mass at the bottom of the graduate remained fluid after the three-day standing period and was readily poured from the tube with the supernatant water.

EXAMPLE 13

A silt-containing river water used for industrial cooling purposes was treated with 1 part per million of a polyelectrolyte of molecular weight 3–5 million which contained 99 percent carbamylethylene linkages and 1 percent carboxyethylene linkages. The treated water was passed into a settling tank and the suspended solids were settled out. The clarified water was used for cooling purposes. After a two-week period, the tank was cleaned out by removing the clear supernatant water and flushing out the settled matter by means of a stream of high pressured water. Treatment with the polyelectrolyte rendered the settled solids soft and mobile and prevented the accumulation of compacted masses on the bottom of the tank. The treatment reduced clean-out time and labor by a factor of about 65 percent.

EXAMPLE 14

To determine the beneficial effect of polymer treatment in the pumping of fine ore materials, a 1 percent suspension of phosphate rock slimes was treated with 2 pounds per ton of the polyacrylamide used in Example 13. The suspension was then thickened by gravity to about 16 percent solids. The solids were thus rendered mobile and amenable to pumping. Compared to a similar sample of untreated slimes, power losses due to friction were reduced by 25 percent by the treatment of polyacrylamide, and if pumping is interrupted, the low points in the pipe system remain free from clogging.

EXAMPLE 15

The polyacrylamide used in Example 13 was added in quantities in about 10 parts per million to the circulating water in an automobile radiator. The motor of the automobile was operated for a period of 10 minutes in order to thoroughly distribute the polyacrylamide throughout the entire volume of water in the radiator. The radiator was then drained by gravity. The suspended sludge and rust solids were kept fluid and mobile and were readily drained out of the radiator by merely opening the drainage vent at the bottom of the radiator. This result was in marked contrast with the usual radiator cleaning procedure which required several flushings with water to remove incompletely the accumulation of rust and sludge.

I claim:

1. In the leaching of a suspension of solids in water in which the solids range from comparatively coarse, including particles larger than 65 mesh, to very fine materials, including particles smaller than 325 mesh, and which suspension, at least when allowed to settle, has a high solids content of at least about 30% solids, and which suspension in the absence of a suspending agent, when in a quiescent state separates with the formation of a solid cake, which stalls agitators and resists resuspension, the step which comprises: adding to said water suspension of solids a small but effective amount of a water soluble polyelectrolyte suspending agent, from 0.005 to 5 pounds per ton of suspended solids, which is an ampholytic linear carbon chain vinyl polymer consisting essentially of recurring carbamylethylene and carboxyethylene linkages and not more than a minor amount of nitriloethylene linkages, and salts thereof, having a weight average molecular weight in excess of 100,000, thereby producing a suspension which is of uniform characteristics and from which the solids drop out as an unclassified readily resuspendable material, said polymer increasing the viscosity of the aqueous phase, insuring laminar flow at higher velocities, thereby reducing pumping power requirements, and simultaneously stabilizing the suspension, so that during interruptions in agitation, the suspension remains fluidized, and in pumpable condition.

2. The process of claim 1 in which the leaching is of a mineral suspension at a pH more acid than 4, and the polyelectrolyte has a major proportion of

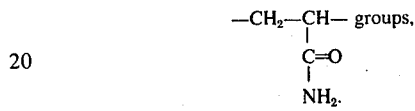

3. The process of claim 1 in which the polyelectrolyte is added as a sub-divided dry solid.

4. The process of claim 1 in which the polyelectrolyte has the structure, in acid form:

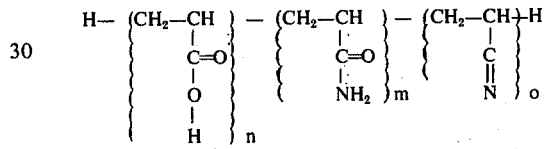

where $n$, $m$ and $o$ are whole numbers, and the groups within the parentheses may occur in random order and orientation.

5. The process of claim 1 in which the polyelectrolyte is

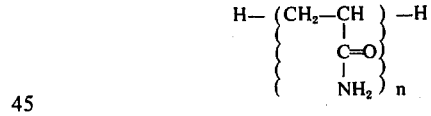

where $n$ is a large whole number, such that the molecular weight is at least 100,000 and a small proportion, not more than about 6.2 percent, of the amide groups are hydrolyzed to carboxyl groups.

* * * * *